Feb. 22, 1955  J. W. DICKEY  2,702,470
FREEZEMETER
Filed July 23, 1953
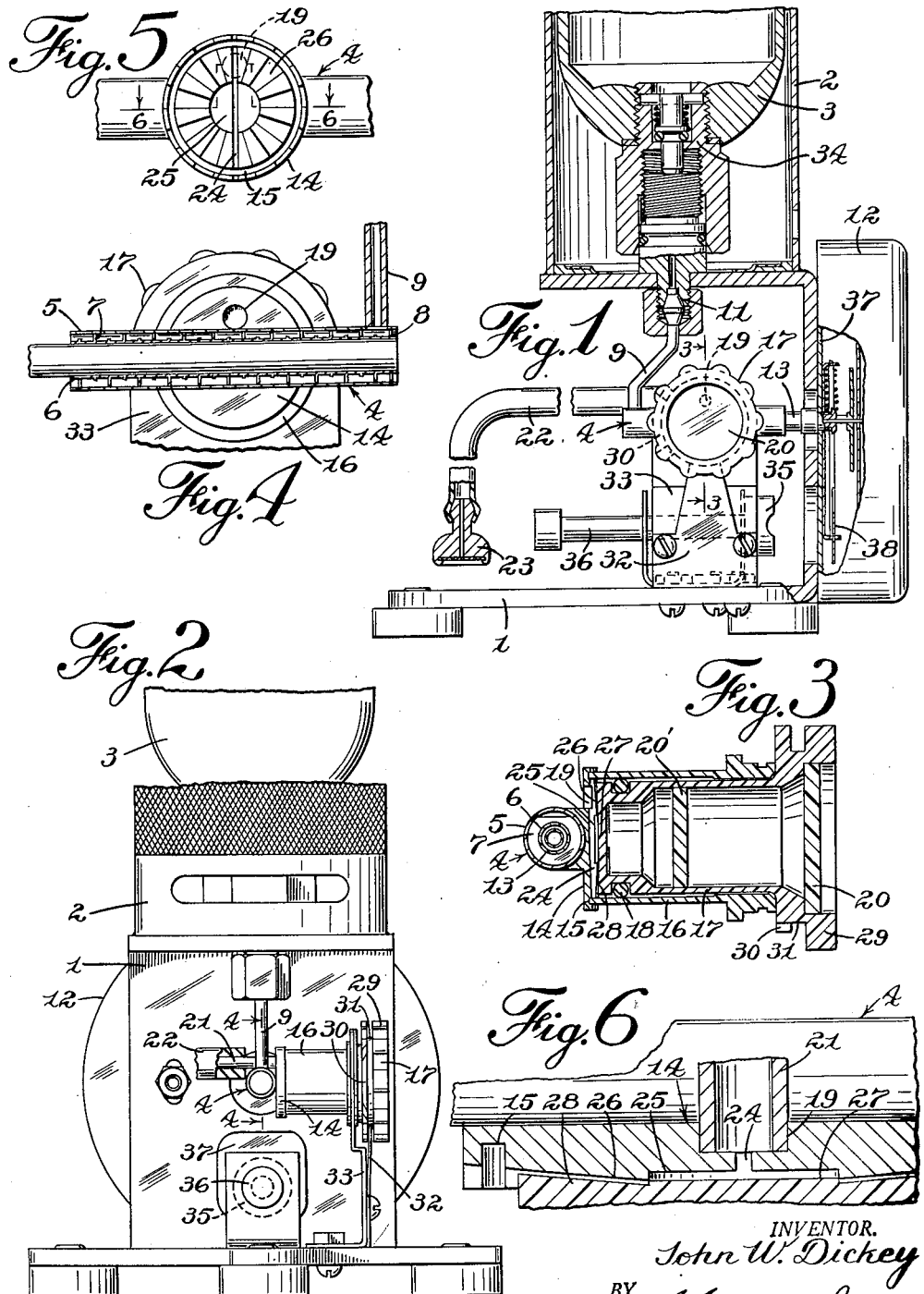
INVENTOR.
John W. Dickey
BY
Clinton S. Janes
ATTORNEY
WITNESS:

United States Patent Office 2,702,470
Patented Feb. 22, 1955

2,702,470
FREEZEMETER

John W. Dickey, Newfield, N. Y., assignor to Bendix Aviation Corporation, a corporation of Delaware Application July 23, 1953, Serial No. 369,877

6 Claims. (Cl. 73—17)

The present invention relates to a freeze-test meter and more particularly to an instrument for determining the thawing point of an arctic coolant for internal combustion engines.

It is an object of the present invention to provide a novel freeze-test meter which is efficient and convenient in operation, and productive of consistent determinations over a wide range of characteristics of liquids to be tested.

It is another object to provide such a device using a visual end point indication which is readily observed with high accuracy.

It is another object to provide such a device which utilizes a small quantity of the liquid sample and consequently is economical in the use of refrigerant medium.

It is another object to provide such a device which incorporates means for thoroughly agitating the sample during the freezing process to prevent supercooling without congelation.

Further objects and advantages will be apparent from the following description taken in connection with the accompanying drawing, in which:

Fig. 1 is a side elevation, partly broken away and in section, of a preferred embodiment of the invention;

Fig. 2 is an end view of the same;

Fig. 3 is an enlarged section taken substantially on the line 3—3 of Fig. 1;

Fig. 4 is an enlarged section taken substantially on the line 4—4 of Fig. 2;

Fig. 5 is an enlarged detail of the stationary freezing element in elevation; and Fig. 6 is a further enlarged sectional detail of the interengaging portions of the freezing and agitating elements, the section being taken substantially on the line 6—6 of Fig. 5.

In Fig. 1 of the drawing there is illustrated a frame 1 having mounted thereon a tubular holder 2 for a flask 3 containing a compressed cooling agent such as liquid carbon dioxide. A stationary heat exchanger element 4 is rigidly mounted in any suitable manner on the frame 1. It comprises a pair of telescoped tubes 5 and 6 (Fig. 4) having a plurality of annular baffles 7 maintaining the tubes in coaxial relation, and providing a labyrinthine path in the space between the tubes. This space is closed at one end as indicated at 8, and is connected by a tube 9 to the discharge nozzle 11 of the refrigerant flask 3.

A thermometer 12 is mounted on the side of the frame 1 and has a stem 13 extending into the heat exchanger 4 with its heat-sensitive element centrally located therein.

The stationary heat exchanger element 4 is provided with a disc-shaped flange 14 of heat conductive material such as copper having a channel 15 near its periphery for the reception of a cylinder 16 of insulating material such as nylon rigidly mounted therein. A piston member 17 of transparent insulating material such as Lucite is slidably and rotatably mounted in the cylinder 16 and is provided with a packing ring 18 of elastically deformable material having a sliding bearing in said cylinder. The cylinder 16, with flange 14 and piston 17 form a receptacle for holding a sample of the liquid to be tested.

The flange 14 of the heat exchanger has an opening 19 (Fig. 4) therethrough in which a tube 21 (Fig. 2) is rigidly mounted. A flexible hose 22 is attached to the tube 21 and has an inlet fitting 23 on its end which is preferably provided with a strainer as shown in Fig. 1. The flange 14 is provided on its inner surface with a diametrically arranged slot 24 (Figs. 3 and 5) communicating with a central flat recessed portion 25 which is surrounded by a series of teeth or undulations 26. The movable piston member 17 is also provided with a central flat surface 27 which is surrounded by a series of teeth or undulations 28 complementary to those on the heat exchanger flange 14.

The piston 17 is provided with a terminal flange 29 which is conveniently formed for manipulation of the piston, and has a groove 31 formed therein for the reception of a guide member 32 mounted on a bracket 33 (Fig. 2) which forms a support for the outer end of the cylinder 16. The flange 29 is cut away at one point as shown at 30 to permit the piston to be drawn outwardly when this cut-away portion is brought into registry with the guide member 32.

In operation, the inlet fitting 23 is introduced into a container of the liquid to be tested, and the piston 17 is reciprocated within the cylinder 16 a few times in order to draw a sample of the liquid through the hose 22 into the cylinder. The piston is then rotated to bring its cut-away portion 30 into registry with the guide blade 32 and pushed in to its nested position in the cylinder as shown in Fig. 3. The valve 34 of the refrigerant flask is then opened to permit gas to flow through the heat exchanger and thus cool the sample below its freezing point. During this freezing operation, the piston 17 is manually rotated, thus causing the sample to be thoroughly agitated between the cooperating undulations 26, 28 of the flange 14 and piston 17. The guide blade 32 is preferably formed of elastic material which permits the longitudinal vibration of the piston responsive to the passage of its undulations over those of the flange 14, but urges the piston into engagement with the flange.

When the freezing operation is complete as evidenced by the white crystalline appearance as viewed through the bottom of the piston, the flow of gas is cut off and the sample permitted to thaw while a constant observation is maintained. As the sample in the circular space between the flat surfaces 25 and 27 thaws, the circle is observed to darken. Shortly thereafter the slot 24 darkens, showing that the material therein has melted, and this is taken as the end point since the slot is in the closest thermal relation to the heat-sensitive element of the thermometer 12.

In order to facilitate observation of the freezing and thawing operation by preventing fogging or frosting of the inside surface of the transparent piston 17, it has been found helpful to place transparent diaphragms in the piston as shown at 20 and 20' in Fig. 3.

Since the operator is maintaining a close observation of the sample, it is convenient to use some means for arresting the thermometer needle when the end point is reached. Such means is here illustrated in the form of a permanent magnet 35 attached to a plunger 36 slidably mounted on the body frame 1 in position to be moved by the operator into engagement with the back of the thermometer case 37. The flux from the magnet then operates a needle-arresting device indicated generally by numeral 38. Such an arrangement is shown and described in the patent of Dickey et al., 2,635,458, issued April 21, 1953, and further description thereof is believed unnecessary since it forms no part in the present invention.

Although but one embodiment of the invention has been shown and described in detail, it will be understood that other embodiments are possible and changes may be made in the design and arrangement of parts without departing from the spirit of invention.

I claim:
1. In a freeze-test meter for liquids, a sample-holding receptacle including a stationary element of heat conductive material having a disc-shaped flange, a cooperating movable heat-insulating transparent member having an opposed disc-shaped surface, and means cooperating with said element and said member for confining a sample of the liquid to be tested therebetween; means for cooling the stationary element below the freezing point of the sample, means for indicating the temperature of said element, and cooperating means on the stationary and movable elements for agitating the sample confined therebetween responsive to rotation of the movable element.

2. A freeze-test meter as set forth in claim 1 in which the sample confining means is in the form of a hollow cylinder of which the stationary element forms the base, and the movable element is in the form of a piston rotatable and slidable in said cylinder.

3. A freeze-test meter as set forth in claim 1 in which the stationary element is provided with a diametrical slot in the surface in contact with the liquid sample.

4. A freeze-test meter as set forth in claim 1 in which the means for agitating the sample is in the form of a plurality of interengaging radial projections and recesses on the opposed surfaces of the stationary and movable elements.

5. A freeze-test meter as set forth in claim 4, in which the central portions of the opposed surfaces of the stationary and movable elements are smooth and flat.

6. A freeze-point tester as set forth in claim 2 including means for conducting liquid to be tested into the space between the stationary and movable elements, packing means carried by the movable element engaging the inner surface of the cylinder, and means for manipulating the movable member to draw the sample into the cylinder.

No references cited.